(12) United States Patent
Tapia et al.

(10) Patent No.: US 9,100,854 B2
(45) Date of Patent: Aug. 4, 2015

(54) QUALITY OF SERVICE APPLICATION CONTROLLER AND USER EQUIPMENT APPLICATION PROFILER

(71) Applicant: T-Mobile USA, Inc., Bellevue, WA (US)

(72) Inventors: Pablo Tapia, Snoqualmie, WA (US); Mehul Shah, Sammamish, WA (US); Alexandru Catalin Ionescu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 113 days.

(21) Appl. No.: 13/705,014

(22) Filed: Dec. 4, 2012

(65) Prior Publication Data
US 2013/0142043 A1  Jun. 6, 2013

Related U.S. Application Data

(60) Provisional application No. 61/567,562, filed on Dec. 6, 2011.

(51) Int. Cl.
*H04W 28/02* (2009.01)
*H04L 12/24* (2006.01)
*H04W 88/02* (2009.01)

(52) U.S. Cl.
CPC ....... *H04W 28/0268* (2013.01); *H04L 41/5003* (2013.01); *H04W 88/02* (2013.01)
USPC ........................................................ 370/230

(58) Field of Classification Search
None
See application file for complete search history.

(56) References Cited

U.S. PATENT DOCUMENTS

| 2003/0229760 A1 | 12/2003 | Doyle et al. | |
|---|---|---|---|
| 2005/0286488 A1* | 12/2005 | Briscoe et al. | 370/351 |
| 2006/0168303 A1* | 7/2006 | Oyama et al. | 709/231 |

(Continued)

FOREIGN PATENT DOCUMENTS

| KR | 20030075903 A | 9/2003 |
|---|---|---|
| WO | WO2007121096 A1 | 10/2007 |

OTHER PUBLICATIONS

The PCT Search Report and Written Opinion mailed Mar. 12, 2013 for PCT application No. PCT/US12/68160, 8 pages.

(Continued)

*Primary Examiner* — Kerri Rose
(74) *Attorney, Agent, or Firm* — Lee & Hayes, PLLC (57) ABSTRACT

Various topologies of a quality of service application controller and related techniques to optimize the communications performance an application executing on a device participating in a communications environment are disclosed. The communications environment may include a cellular network, an unlicensed spectrum network, or a combination of the two. The quality of service application controller observes one or more key performance indicators of the communications network, and retrieves a policy from a policy store specific to the application. The quality of service application controller then modifies the execution of the application and/or the configurable aspects of the communications environment to optimize the communications performance of the application. For example, the application's data throughput may be increased, the power draw of the application may be minimized, data requested by the application may be minimized, or the apparent response time of the application's response to a web service may be minimized.

23 Claims, 4 Drawing Sheets

(56) References Cited

U.S. PATENT DOCUMENTS

| | | |
|---|---|---|
| 2006/0225082 A1 | 10/2006 | Yao et al. |
| 2006/0268716 A1 | 11/2006 | Wijting et al. |
| 2008/0057894 A1 | 3/2008 | Aleksic et al. |
| 2009/0222842 A1 | 9/2009 | Narayanan et al. |
| 2009/0231999 A1 | 9/2009 | Verma et al. |
| 2010/0034083 A1 | 2/2010 | Prakash et al. |
| 2011/0110333 A1 | 5/2011 | Chen |
| 2011/0122885 A1 | 5/2011 | Hedman et al. |
| 2011/0161484 A1 | 6/2011 | Van den Bogaert et al. |
| 2011/0188457 A1 | 8/2011 | Shu et al. |
| 2011/0191482 A1* | 8/2011 | Przybysz et al. ............... 709/228 |
| 2011/0242979 A1 | 10/2011 | Feroz et al. |
| 2012/0013748 A1 | 1/2012 | Stanwood et al. |
| 2012/0069763 A1 | 3/2012 | Zhao et al. |
| 2012/0271958 A1* | 10/2012 | Oh ................................ 709/228 |
| 2013/0065551 A1 | 3/2013 | Raleigh et al. |
| 2013/0107706 A1 | 5/2013 | Raleigh |
| 2013/0114485 A1 | 5/2013 | Vannithamby et al. |
| 2013/0121206 A1 | 5/2013 | Turanyi et al. |
| 2013/0166623 A1 | 6/2013 | Stanwood et al. |
| 2013/0185586 A1 | 7/2013 | Vachharajani et al. |
| 2013/0225094 A1 | 8/2013 | Mujtaba et al. |
| 2013/0273876 A1 | 10/2013 | Rasanen |
| 2014/0036785 A1* | 2/2014 | Li et al. .......................... 370/328 |
| 2014/0136716 A1* | 5/2014 | Stevens et al. ................ 709/226 |
| 2014/0153391 A1* | 6/2014 | Ludwig et al. ................ 370/230 |
| 2015/0009826 A1 | 1/2015 | Ma et al. |

OTHER PUBLICATIONS

The PCT Search Report and Written Opinion mailed Jul. 26, 2013 for PCT Application No. PCT/US13/35148, 11 pages.

Office Action for U.S. Appl. No. 13/839,575, mailed on Nov. 17, 2014, Pablo Tapia, "Rule-Based Application Controller for Signaling Reduction", 20 pages.

Office Action for U.S. Appl. No. 13/839,035, mailed on Nov. 3, 2014, Pablo Tapia, "Application Controller for Quality-of-Service Configuration of a Telecommunication Device Radio", 23 pages.

Final Office Action for U.S. Appl. No. 13/839,575, mailed on Mar. 13, 2015, Pablo Tapia, "Rule-Based Application Controller for Signaling Reduction", 24 pages.

Office Action for U.S. Appl. No. 13/839,035, mailed on Apr. 15, 2015, Pablo Tapi, "Application Controller for Quality-of-Service Configuration of a Telecommunication Device Radio", 19 pages.

* cited by examiner

QUALITY OF SERVICE APPLICATION CONTROLLER AND USER EQUIPMENT APPLICATION PROFILER

RELATED APPLICATIONS

This patent application claims priority to U.S. provisional patent application Ser. No. 61/567,562, titled "QoS Application Controller and Handset Application Profiler", filed Dec. 6, 2011, which is incorporated by reference in its entirety herein.

BACKGROUND

As communications networks have increased in both capacity and capability, applications have demanded an increasing amount of data. Presently, cellular networks are in their fourth generation ("4G") where voice services are being ported from switch based systems to packet based systems, video calls and multi-media streaming are typical scenarios, and social networking and electronic mail applications constantly receive notifications and other data from web services and/or applications over the Internet.

Developing communications environments into heterogenous networks ("hetnets") that combine cellular networks with unlicensed spectra, such as Wi-Fi networks has increased network capacity and a mechanism to load balance servicing data requests.

However, the advantages of larger capacity communications environments are offset by the proliferation of user equipment such as smartphones, wireless tablets, and laptop computers connected via cellular modems. Specifically, user equipment has diversified to larger form factors and more powerful processors which in turn have increased user expectations for higher resolution and higher fidelity multimedia experiences.

However, different applications have different data use profiles. For example, data demands of an Internet news browser are typified by brief bursts of high data use as a user requests content, followed by extremely low data use as the user reads or otherwise consumes the content. In contrast, a user watching a video has a more extended periods of high data use as a video buffer is filled.

Accordingly, there is an opportunity to develop a way to control quality of service, given limited communications capacity compared to application data demand, on a per application basis, not presently in the art.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Optimization Via a Quality of Service Application Controller

This disclosure describes a quality of service application controller that dynamically optimizes application execution on user equipment participating in a communications environment on a per application basis. For example a user watching a movie streamed over a video web service on the Internet via a cellular connection at home may execute a policy to offload some data throughput to the user's home Wi-Fi network. By way of another example, a user participating on a video conference on a laptop with a cellular modem may execute a policy to lower the priority of voice data in favor of video data in order to minimize synchronization errors between voice and video. These policies may execute either upon the start up of an application or during run time of an application.

Furthermore, optimization may come in several forms. Typically, a user will desire the best quality of data rendering with the minimum response time. In this situation, optimization may mean increasing data throughput. However, user equipment devices participating on a cellular network portion of a communications environment are typically billed charges based on the volume of data used over the cellular network. In this situation, optimization may mean reducing data charges and therefore minimizing data throughput, the opposite of the previous example. Optimization need not be specific to data. For example, user equipment may be in the form of a mobile smartphone with limited battery life. In this situation, optimization may mean limiting power draw on the smartphone's battery as to prolong battery life.

Oftentimes optimization is subjective. For example, a user equipment device's connection over a communications environment may have excellent quality of service from the perspective of having maximum data throughput. But if the application on the device that renders data is inefficient, for example a video player that does not refill its buffer quickly enough, the user's perception, or quality of experience will be worse that what would otherwise be available from the high quality of service connection. A typical scenario is to minimize an application's response time to a web service. Specifically, the time between an application request and the application rendering data returned by the corresponding web services' response should be minimized. Accordingly, optimization is more than increasing data throughput over a cellular network. Rather, optimization may be to reconfigure the cellular environment, reconfigure the application, reconfigure the operating system, and potentially provide feedback to the web service. In particular, optimization may be application specific.

Figure 1:
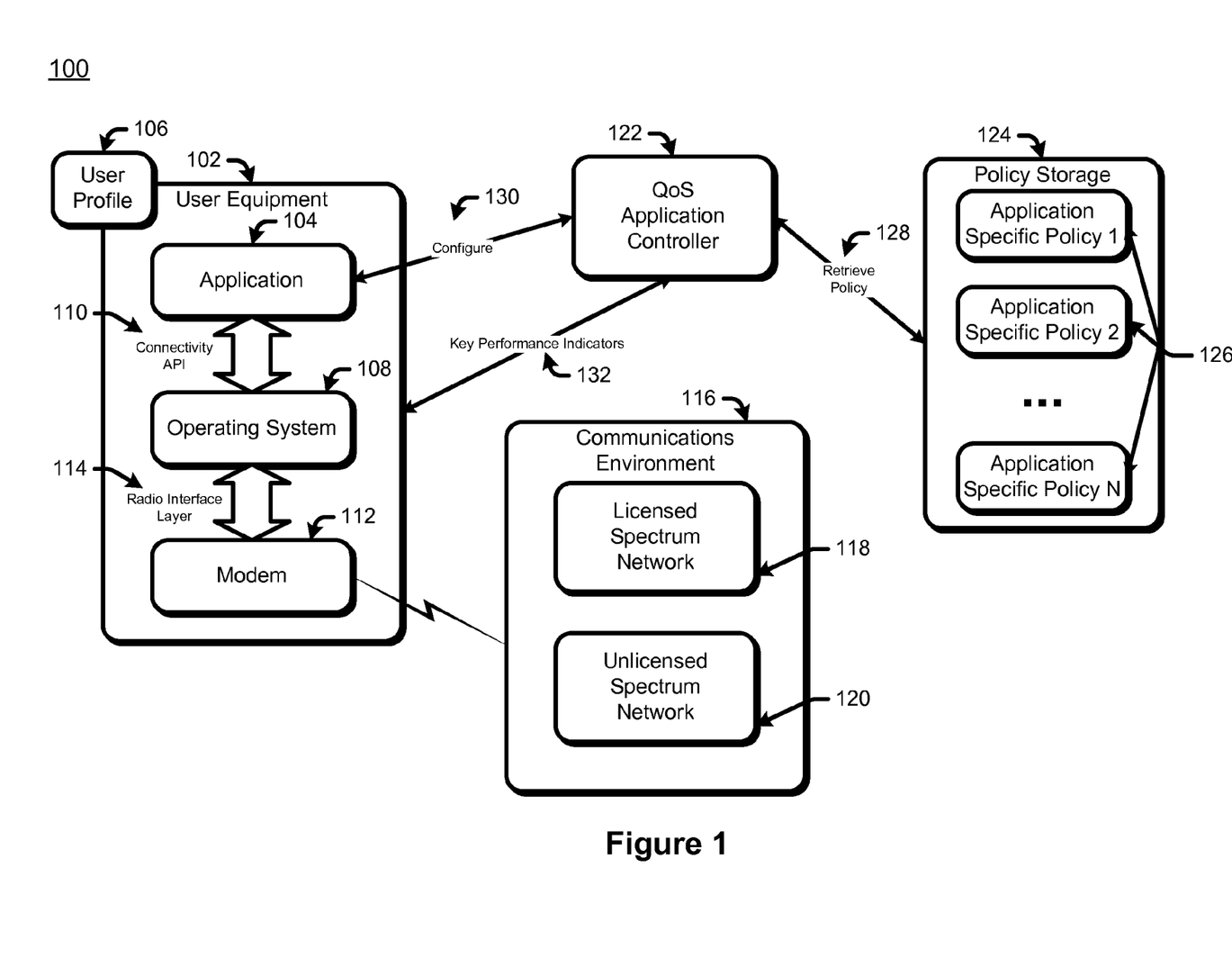
FIG. 1 is a high level diagram illustrating the hardware and communications environment of a quality of service application controller and user equipment application profiler.

FIG. 1 is a diagram illustrating an exemplary environment 100 for a quality of service application controller enabled to provide per application optimization as described above.

A user equipment device 102 includes any device that may participate on a communications network. The user equipment device 102 may be fixed, such as a personal computer, or may be may be a mobile device, such as a smartphone.

The user equipment device 102 may execute an application 104. The application 104 may be strictly a client side application such as a non-networked casual game, or may rely on a web service such as an electronic mail reader connected to an electronic mail service, or may have server side components such as an Internet browser connected to a web site.

The application 104 may execute on an operating system 106 such as Google Android™ or Apple iOS™. In particular, the application 104 may participate on a communications network by invoking a communications application programming interface ("API") 110 exposed by operating system 106. In turn, the operating system 106 may access a modem and radio hardware 112 via a radio interface layer API 114. An operating system 106 may segregate operation into a user mode and a kernel mode. The kernel provides operations to manage processes, threads, memory management, input/output and other functionality common to multiple applications. Thus, if the kernel ceases operation, for example from a fatal programming bug, then all applications will cease operation. To isolate fatal programming bugs in a particular application from affecting other applications, operating system 106 may expose an application's access to the operating system 106 to user mode functions that upon failure, will not extend failure to the kernel. The user equipment device and associated software are discussed in more detail with respect to FIG. 2.

The modem and radio hardware 112 provide wireless connectivity for the user equipment device 102 to a communications environment 116. The communications environment 116 includes all equipment to support a communications network. A communications network may be a cellular network operating on licensed spectrum 118. For example, in the United States, licensed spectrum would include any spectrum licensed by the Federal Communications Commission ("FCC") such as spectrum for cellular networks. In this case, the communications environment would include towers, base station controllers, voice and data nodes and gateways.

A communications network may be a network not operating on licensed spectrum 120. Specifically, a wireless network whose power is not sufficiently strong to impact the operation of non-local equipment generally does not make use of licensed spectrum. Accordingly, examples of unlicensed networks may include Wi-Fi networks. In this case, the communications environment may include Wi-Fi access points and internet protocol routers, repeaters, switches and bridges. As licensed spectrum networks 118 and unlicensed spectrum networks 120 are used in combination as heterogenous networks, a communications environment 116 may include both licensed and unlicensed spectrum networks 118, 120.

A quality of service application controller 122 is communicatively coupled to one or more applications 104 on user equipment device 102, and operates to monitor startup, execution, and shut down of the applications 104 and operations on the user equipment device 102. Monitoring includes receiving key performance indicators ("KPI") that can be measured that relate to the operation of the application 104, or the user equipment device 102 itself. For example, a KPI may be communications related and measure network throughput or network latency. A KPI could relate to power draw on a battery over time. A KPI might be a binary measure such as merely determining whether a particular application 104 is on or off. KPIs are typically exposed through APIs by the application 104 or the operating system 106. KPIs specific to chipsets and other user equipment device 102 hardware may be exposed via APIs implemented in kernel mode device drivers, thereby providing programmatic access. KPIs may be combined, aggregated and/or analyzed statistically to provide a composite KPI. For example, an average power draw over time may be calculated from a power draw measure and date/time stamps. Thus KPIs may measure an application, a specific portion of the user equipment device 102, or the user equipment device 102 as a whole.

The quality of service application controller 122 may reside in any number of places. While the quality of service application controller 122 may be communicatively coupled to various portions of the user equipment device 102 and associated software, it may be advantageous to choose the hosting location based on what KPIs are to be measured and the user equipment device 102 capabilities. For example, if most of the KPIs to be measured apply to multiple applications, than hosting the quality of service application controller 122 might be local to the user equipment device 102 and in particular be hosted in the operating system. However, if the user equipment device 102 has insufficient processing capabilities to host the quality of service application controller 122, or if distribution of the quality of service application controller 122 is otherwise too difficult to manage, the quality of service application controller 122 may be hosted remotely on a server, for example a server part of the communications environment 116.

The location of the quality of service application controller 122 may varying according to the whether the quality of service application controller 122 is to reside within a specific programming boundary, or whether the quality of service application controller 122 is to have a specific focus. For example, some user equipment device 102 functionality may be partially implemented in a chipset and partially implemented in software, such as the radio interface layer and the communications stack. Accordingly, the quality of service application controller 122 may reside in the radio interface layer, or a particular layer of the communications stack. Similarly, if the quality of service application controller 122 has a specific focus on a particular application type, such as multimedia, then the quality of service application controller may advantageously reside in a media framework library.

A more general quality of service application controller 122 may reside as a separate user mode application on user equipment device 102, where KPIs are received through extensions of the radio interface layer, communications stack, operating system, and media framework. Hardware KPIs may be exposed via additional device drivers or modifying existing device drivers. Software KPIs may be exposed by adding additional APIs to the corresponding software.

The quality of service application controller 122 may be communicatively coupled to a policy storage 124. For example, policy storage 124 may be a file server participating on a network, such as a network in communications environment 116. Alternatively, the policy storage 124 may be local to the user equipment device 102 for example in a static file, potentially periodically updated via the communications environment 116. In some cases the policy storage may be resident on the application 104 itself. In particular, policies need not be static, but alternatively may be dynamically generated by the application during run time, either from a request by the quality of service application controller or other trigger. In some cases, a separate, trusted application, executing either on the user equipment device 102 or on a remote server, may store policies. The trusted application may be privileged to provide policies either by running under the same account and privileges as the application 104, or by negotiating privileges via cryptographic key exchange. By way of yet another example, the policy storage may be fully or partially resident in hardware such as in the modem or radio.

Regardless of location, the policy storage 124 contains one or more application specific policies 126 describing how the user equipment device 102, associated software such as the application 104 and operating system 108, and/or communications environment 116 is to reconfigure, specific to an application launch, operation, shutdown, or observed KPI.

Figure 3:
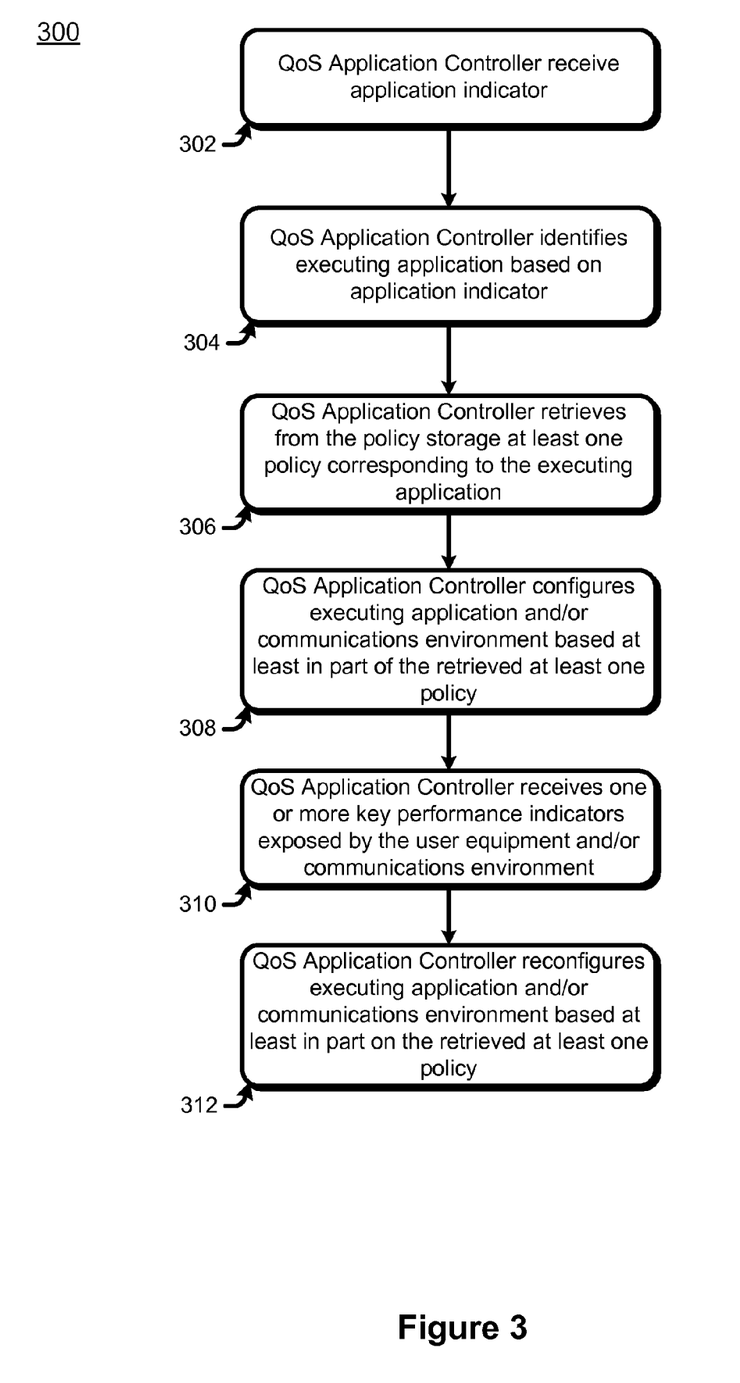
FIG. 3 is a flow chart an exemplary operation of a service application controller with a policy storage.
Figure 4:
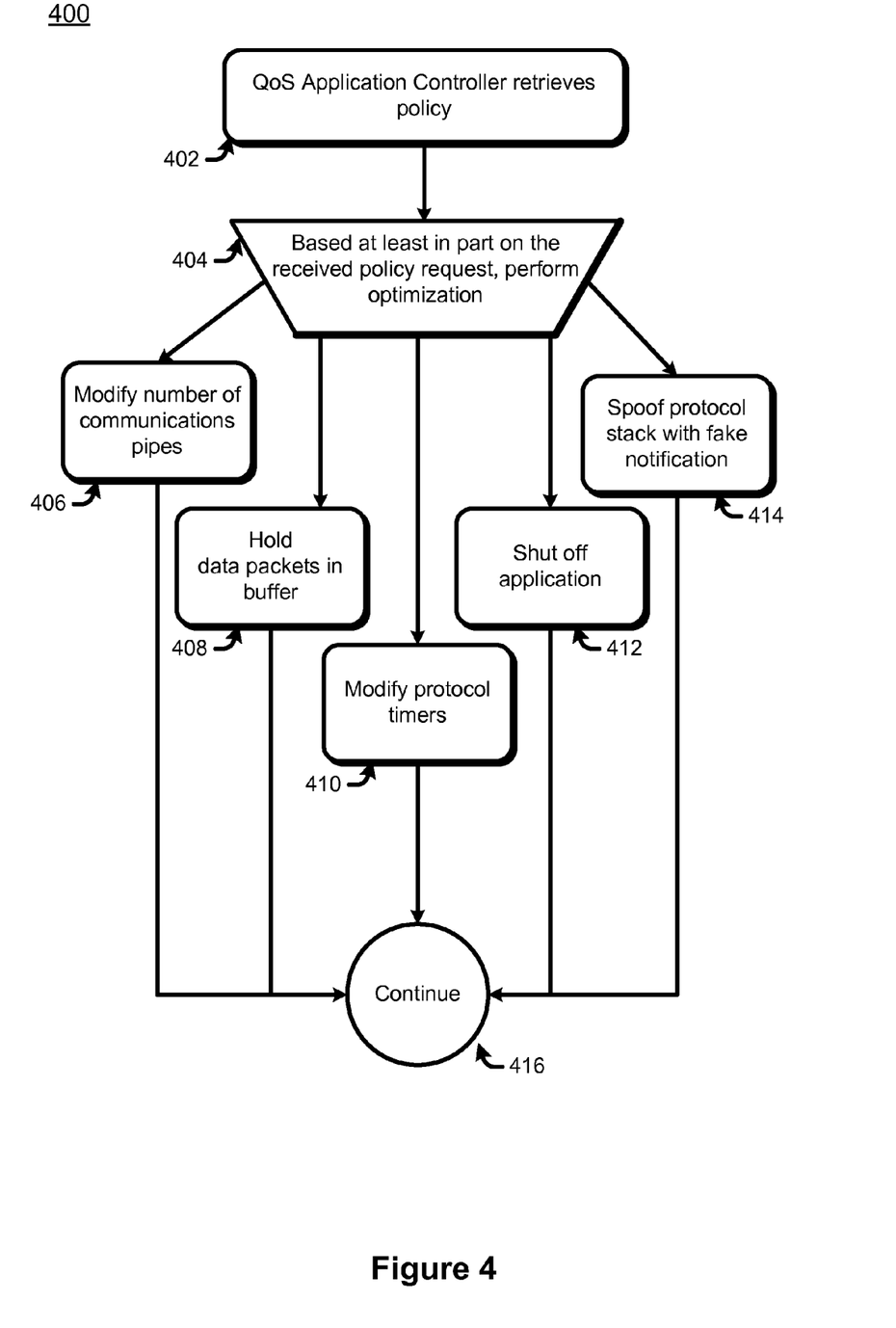
FIG. 4 is a flow chart of various techniques of the quality of service application controller to optimize a communications environment.

The operation of the quality service application controller and policies are described in more detail with respect to FIGS. 3 and 4.

Within this context, the quality of service application controller 122 may operate to monitor user equipment device 102, and may observe an application 104 launch. Based on the launch, the quality of service application controller 122 may retrieve a policy 128 specific to the launched application 104 from policy storage 124. The quality of service application controller 122 may then configure the user equipment device 102, the application 104, the operating system 108, or potentially the communications environment 116. For example, the quality of service application controller 122 may send a request to the communication environment 116 to open more communications pipes. The quality of service application controller 122 may observe one or more key performance indicators 132 and may reconfigure 130 according to the retrieved policy 128. The operation of the quality of service application controller 122 is described in more detail with respect to FIG. 2.

Exemplary Hardware Platform

Figure 2:
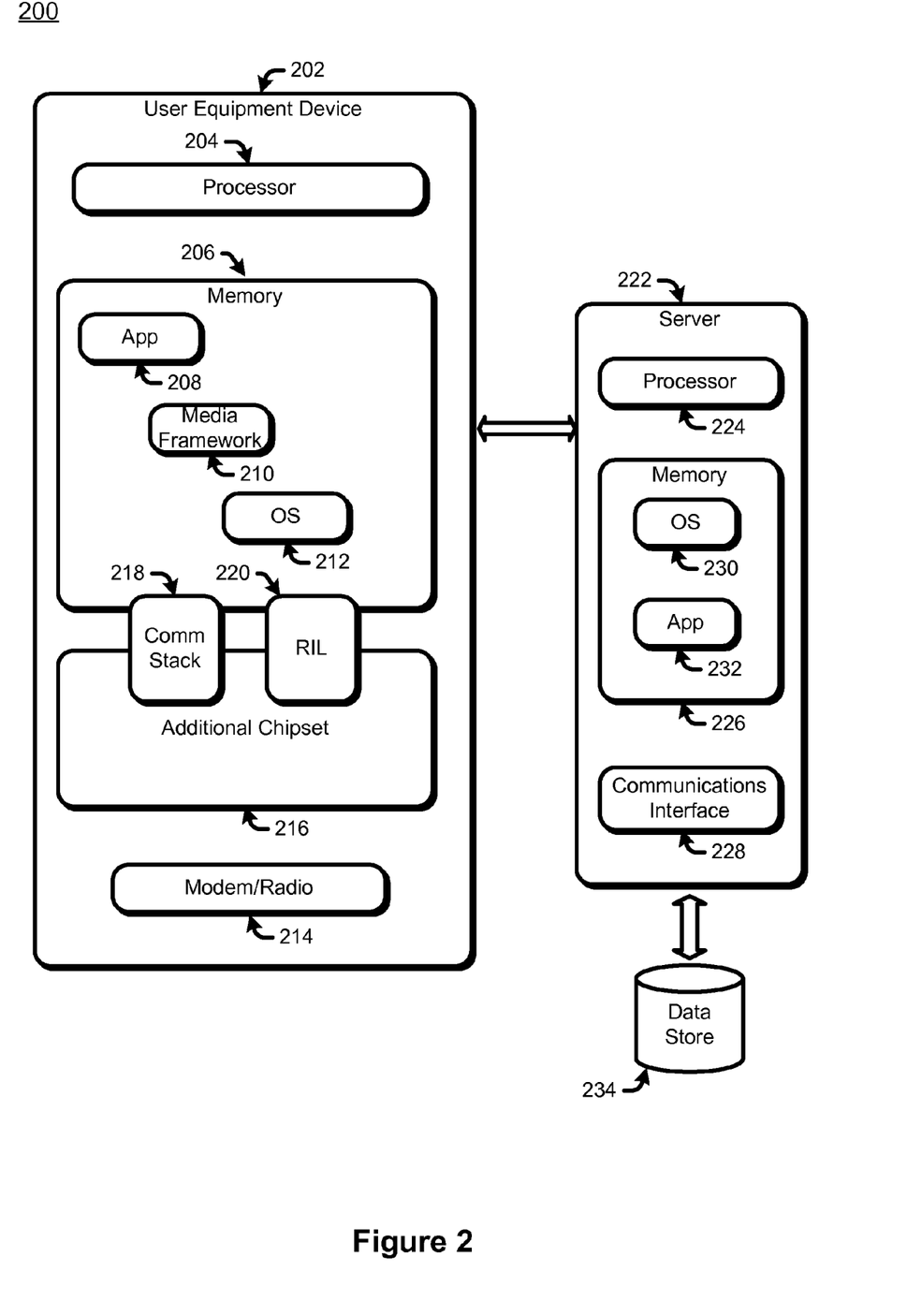
FIG. 2 is a block diagram of exemplary user equipment in the context of a quality of service application controller and user equipment application profiler.

FIG. 2 illustrates one possible embodiment of a hardware environment 200 for the quality of service controller and its environment.

User equipment device 202 is any computing device participating in a communications environment. A user equipment device 202 may have a processor 204 and a memory 206.

Client device 202's memory 206 is any computer-readable media which may store several programs including an application 208, media framework or other library 210 and/or an operating system 212.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a modem and a radio 214. The modem/radio 214, separately or in combination may supports one or more transports. For example, modem/radio 214 may support unlicensed spectrum communications such as Wi-Fi, or licensed spectrum such as WCDMA and CDMA2000. Alternatively, user equipment device 202 may have multiple modems/radios 214 to support different communications transports.

To facility participation in a communications environment, user equipment device 202 may have additional chipsets 216. These chipsets may fully or partially implement application or communications specific functionality in hardware. Common examples include the communications stack 218 and the radio interface layer 220.

User equipment 202 may communicate to a server 222. Server 222 is any computing device that may participate in a network. The server may be part of the communications environment. Examples may include servers in a cellular base station, or alternatively in the core network for a cellular carrier. Alternatively, server 222 may be part of a Wi-Fi access point, or a separate network aware device participating on a Wi-Fi network. Server 222 comprises processor 224, memory 226 and communications interface 228. As per the preceding discussion regarding user equipment device 202, memory 226 is any computer-readable media including both computer storage media and communication media.

In particular, memory 226 stores software which may include an operating system 230 and/or an application 232. Memory 226 may also store applications 232 that may include a database management system. Accordingly, server 222 may include data store 234. Data store 234 may be configured as a relational database, an object-oriented database, and/or a columnar database, or any configuration to support policy storage.

Example Operation of the Quality of Service Application Controller

FIG. 3 illustrates an example operation 300 of the quality of service application controller. Specifically, FIG. 3 illustrates how a quality of service application controller detects an application and configures the user equipment device and/or communications environment according to a policy both a startup time and during runtime.

In block 302, the quality of service application controller receives an application indicator. Specifically, the quality of service application controller receives an indicator that an application is starting. This may be via a notification from the operating system that exposes a unique application identifier. Since some applications may be tied to a web service, the quality of service application controller may determine that the launched application is an Internet browser, and may monitor the URL and/or IP address accessed and/or the addressed port.

Upon receiving the application indicator, in block 304 the quality of service application controller identifies the corresponding application. In the case where the unique application identifier identifies a local application, such as a non-networked casual game, there may be a lookup table to resolve the application identifier to specific information about the application. Where the unique application identifier is identified to rely on a networked or web service, such as a social networking client or electronic mail client, the quality of service application controller may identify the corresponding web service. In cases where the unique application identifier corresponds to an Internet browser, the URL and/or IP address and address port information from block 302 may be utilized to identify server side application functionality. For example, the optimal communications configuration from a video web site is typically different from a news web site, although both sites could be accessed by the same Internet browser and hence be identified by the same unique application identifier.

Based on the application identified, in block 306, the quality of service application controller will access the policy storage and retrieve one or more policies corresponding to the identified application. Upon retrieval, in block 308, the quality of service application controller will execute one or more of the retrieved policies. The policies may configure the user equipment device, the application, the operating system, specific portions of the user equipment or other software such as the communications stack and/or media framework and/or other libraries. The quality of service application controller may send requests to the communications environment as well. Example policies are described in more detail with respect to FIG. 4.

During runtime of the application, conditions on the device or in the communications environment may change. For example, network congestion may increase. Accordingly in block 310, the quality of service application controller may continue to monitor the user equipment device, associated software, and communications environment, in particular to monitor KPIs. Upon receiving a KPI that triggers a reconfiguration event, in block 312 the quality of service application controller will reconfigure the user equipment device, the application, the operating system, specific portions of the user equipment or other software such as the communications stack and/or media framework and/or other libraries as in block 308.

Example Quality of Service Application Controller Policy Operation

FIG. 4 illustrates the operation 400 of various example policies available to the quality of service application controller.

In block 402, the quality of service application controller retrieves a policy, either in response to an application starting, or from some other trigger. In block 404, the quality of service application controller will read the policy and perform one or more optimizations. Some policies may be implemented conditionally. For example, the user equipment device may store a profile storing general user preferences and/or application specific user preferences. The preference may override the quality of service application controller, and indeed may provide an option to make the application exempt from the quality of service application controller, from particular policies, or may specify alternate policies. Two or more policies may be performed in combination. In 400, the optimization techniques are illustrated in a one to one correspondence with a policy.

In block 406 an optimization requested by a policy may be to open or close or to configure/reconfigure communications pipes. For example, the user equipment device may be configured to have a number of generic communications pipes in reserve. In the event an application is likely to use more data, one or more additional communications pipes may be opened. Conversely, if an application is likely to use less data, then communications pipes may be closed. In particular, different applications will have different data use templates. Thus opening and closing communications pipes would provide an application specific technique to control data throughput. Configuration/reconfigure may include modifying attributes of a communications pipe including, but not limited to modifying maximum bitrate, granted bitrate, or other bitrate attributes, pipe traffic class/quality class indicator, and allocation and retention priorities.

In some cases, an optimization requested by a policy may include changes to the communications environment. For example, in block 408, an optimization requested by a policy may be to hold data packets in buffer. By way of another example, in block 410, the protocol timers may be dynamically modified. The user equipment device may send a request to the communications environment, and may make local changes in the operation of the communications stack.

In drastic cases, an optimization requested by a policy may be to shut an application off. For example, if a particular application has background process updates that are causing unacceptably high charges on a user's data plan, then that particular application may be to shut off network access for that application, or as in block 412, to completely shut off the application. A notification to the user that the application is being shut off may be sent by the quality of service application controller. In this case, this policy may be applied at run time, long after the application has been launched.

In cases where changes to the networks in the communications environment is not desirable, the communications protocol may be spoofed with fake notifications, as in block 414. For example, in some cases, a protocol will negotiate for information that is already known or not used for specific scenarios in use. Accordingly, response packets with sent with hardcoded responses designed to satisfy the protocol thereby shortening response time.

Upon completion of the one or more optimizations requested by a policy, operation continues as in block 416.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a device configured to communicate over a communications network, the device including at least one application executing on the device;
    a policy storage configured to store at least one policy to configure the application; and
    a quality of service application controller communicatively coupled with the device and the policy storage and configured to receive an application indicator of the application, select the at least one policy for the application based on the application indicator, retrieve the at least one policy, and execute the retrieved at least one policy,
    wherein the quality of service application controller is separated and distinct from the application.

2. The system of claim 1, wherein the communications network comprises any one of the following:
    a communications network operating on a licensed band;
    a communications network operating on an unlicensed band; or
    a communications network operating on a licensed band configured to load balance data communications with an unlicensed band.

3. The system of claim 1, wherein the quality of service application controller is executing on the device.

4. The system of claim 3, further comprising an operating system executing on the device, the operating system with a user mode and a kernel mode, and wherein the quality of service application controller is communicatively coupled to the operating system in user mode and in kernel model.

5. The system of claim 4, further comprising a radio interface layer executing on the device, the operating system communicatively coupled to a modem on the device via the radio interface layer, and wherein the quality of service application controller is communicatively coupled to the radio interface layer.

6. The system of claim 4, further comprising a media framework executing on the device and communicatively coupled to the operating system, the application communicatively coupled to the media framework, and wherein the quality of service application controller is communicatively coupled to the media framework.

7. The system of claim 4, further comprising a communications stack executing on the device and communicatively coupled to the operating system, and wherein the quality of service application controller is communicatively coupled to the communications stack.

8. The system of claim 7, the device comprising an integrated circuit implementing the communications stack at least in part and communicatively coupled to the operating system, and wherein the quality of service application controller is communicatively coupled to the integrated circuit.

9. The system of claim 1, wherein the quality of service application controller is executing on a server separate from the device over the communications network, and the device is communicatively coupled to the quality of service application controller over the communications network.

10. The system of claim 1,
wherein the communications network is configured to bill the user for a volume of digital data transmitted and received by the device over the communications network;
wherein the application has a data response time measuring the time between the application's data request and a data response to the application over the communications network;
wherein the application has a power draw measuring an amount of power used by the application as it executes on the device; and
wherein the policies are to do any one of the following:
minimize data flow over the communications network;
maximize data response time of the application; or
minimize the application's power draw on the device.

11. The system of claim 1, wherein the policy storage is resident on the device and at least one policy is statically preconfigured to be stored in the policy storage.

12. The system of claim 1, wherein the policy storage is resident on the application, and the application is configured to dynamically generate the policy upon receiving a request from the quality of service application controller.

13. The system of claim 1, wherein the policy storage is resident on a trusted policy application, the trusted policy application communicatively connected to the application and to the quality of service application controller, and the trusted policy application is configured to dynamically configure the application based upon a generated policy upon receiving a request from the quality of service application controller.

14. The system of claim 1, wherein the policy storage is resident on a server device separate from the device, and the device is communicatively coupled to the policy storage over the communications network.

15. The system of claim 1, wherein the policy storage is resident on the modem.

16. A computer-implemented method comprising:
receiving at a quality of service application controller an application indicator of an application executing on a device;
retrieving from a policy storage a policy based at least on the received application indicator; and
dynamically configuring a communications environment for the application according to the retrieved policy, via the quality of service application controller,
wherein the quality of service application controller is separated and distinct from the application.

17. The method of claim 16, further comprising retrieving by the quality of service application controller a conditional instruction from a user profile for the application.

18. The method of claim 16, wherein the retrieved policy is to modify the number of available communications pipes available in the communications environment.

19. The method of claim 16, wherein the communications environment includes a packet buffer containing data packets to and from the application, and wherein the retrieved policy is to hold at least some data packets in the packet buffer, thereby throttling data throughput.

20. The method of claim 16, wherein the communications environment includes a communications protocol with at least one configurable protocol timer, and wherein the retrieved policy is to modify at least one configurable protocol timer, thereby modifying the timing of the communications protocol.

21. The method of claim 16, wherein the retrieved policy is to shut off the application.

22. The method of claim 17, wherein the communications environment includes a communications protocol, the communications protocol responsive to predetermined notifications, and wherein the retrieved policy is to speed response in the communications protocol by sending fake notifications.

23. A computer-implemented method comprising:
retrieving by a quality of service application controller a policy from a policy storage based at least on an application identifier of an application executing on a device, wherein the application is connected to a web service via a communications environment, the communications environment including a cellular network; and
dynamically configuring the communications environment according to the retrieved policy, via the quality of service application controller to reduce an apparent response time of requests from the application to the web service,
wherein the quality of service application controller is separate and distinct from the application.

* * * * *